3,116,155
MAGNESIUM OXIDE SLIP CASTING METHOD
Stephen D. Stoddard and Donald E. Nuckolls, Los Alamos, N. Mex., assignors to the United States of America as represented by the United States Atomic Energy Commission
No Drawing. Filed July 28, 1961, Ser. No. 127,748
6 Claims. (Cl. 106—58)

The present invention is related to a method of preparing a magnesium oxide slurry for making slip casting ceramics and, more particularly, a method for preparing a magnesium oxide slurry where a vitrified and non-permeable slip cast piece of high strength is required.

Prior to the present invention, the preparation of slip cast pieces of magnesium oxide were made, for example, as shown by Allison in U.S. Patent 2,902,380. Allison's procedure was to mill a slurry composed of magnesium oxide and water for approximately fifteen hours, allow the slurry to age at room temperature until the viscosity was approximately 275 centipoises, add a deflocculent agent, such as hydrochloric acid and then pour the slurry into plaster molds, cast, and fire by the usual techniques, well known to the art. In the Allison process, the magnesium oxide reacted with the water during the aging period to form a magnesium hydroxide. This magnesium hydroxide was essential to the preparation since it allowed the ceramic piece to shrink away from the plaster mold, while in this invention, the drying of absorbed water layer on the fine particulate matter in the cast wall results in the necessary shrinkage from the mold. The ceramic produced using the aforementioned patent has a porosity of about eight percent and was quite permeable. Although this product is still of great utility, it has the deficiency in that it cannot be used to seal a gas tight system due to its permeability. The utilization of ceramics as a lining in nuclear reactor vessels requires a ceramic which is gas tight. The applicants therefore set out to find a method to produce a magnesium oxide ceramic which had no permeability and could be made in a standard gas fired kiln, i.e., firing temperatures below 1750° C. This desired product has been made by the applicants through the milling of fused magnesium oxide at 2 to 10° C. for periods of up to 72 hours and without aging the magnesium oxide slurry, immediately pouring the slurry into conventional uncoated plaster molds, drying and firing at temperatures below 1750° C. The essential difference between this method and that of Allison is the low temperature during the milling process which inhibits the magnesium hydroxide reaction from taking place and thus allows a longer milling time which results in a much finer pulverized magnesium oxide that has a good distribution of particle size, which particles effectively fill the spaces between the larger particles leaving few void spaces and these spaces are not interconnected. The final product made from this method is a vitrified, translucent and most important, non-permeable ceramic.

It is therefore an object of this invention to provide a method for preparing a magnesium oxide slip slurry suspended in water having such characteristics that pieces cast from the material have the properties of high strength and density.

Another object is to provide a method for preparing a magnesium oxide ceramic which is vitrified and non-permeable.

Further objects of this invention will be apparent from the following specification and claims.

By the method of the present invention the magnesium oxide slurry is prepared in the preferred embodiment in the following steps:

Minus 200 mesh (U.S. standard sieve series) fused magnesium oxide is charged into a one and one-quarter gallon porcelain ball mill batched as below:

Fused MgO _____ gm__ 2000
Distilled $H_2O$ _____ cc.__ 600
High density $Al_2O_3$ porcelain balls _____ gm.__ 4200

The loaded mill is rotated at 50–55 r.p.m. in a freezer compartment at 4 to 6° C. for 52 hours. Upon completion of the milling the slurry is removed from the mill. Glycerine (1 cc. per 100 gm. of slip) is added to the slurry to inhibit scumming and lower the slip viscosity. The viscosity is lowered in the main by a deflocculent such as 5 normal hydrochloric acid and a sufficient quantity is added to the slurry until a viscosity of 100 centipoises is reached. The slurry is then cast into conventional uncoated plaster molds. It is necessary to commence casting as soon as the viscosity is adjusted and the anti-scumming agent is added. The casting step is promptly done at the above low temperatures in order to minimize the unwanted reaction of magnesium oxide with water, forming magnesium hydroxide. Casting rate under these conditions is $\frac{1}{16}$-inch wall buildup in 12–18 minutes. The green ware, after drying, is fired on either green, slip cast setters or separated from the kiln bottom by minus 28 plus 100 mesh fused magnesium oxide grain, to 1650° C.±20° for approximately thirteen hours (eight hours to temperature linearly and five hours soak at peak temperature). Gas-air fired kilns are used utilizing an oxidizing atmosphere. Fire shrinkage for this treatment ranges between 13–15 percent and the resulting ceramic body is gas-tight, translucent in character and approximately 95% of theoretical density. Several of the fabrication parameters may be changed in the process as described and yet yield a vitrified and non-permeable ceramic product. For example, the milling time may be decreased to 30 hours if the firing temperature is raised to 2200° C. This temperature is considered uneconomical since a special kiln would be needed to achieve such a high temperature; however, the desired product could be achieved if one wanted a shortened milling time. The shrinkage after this treatment averages eleven percent. With increased milling time, up to 72 hours, the firing temperature can be as low as 1600° C., thus making the process feasible in any standard gas fired kiln and still maintain firing shrinkages of less than 15 percent. In contrast, using the Allison method, one is limited to a milling time of the magnesium oxide slurry of a maximum of about 24 hours since the fine magnesium oxide particles have a large surface area which at room temperatures easily hydrolizes to magnesium hydroxide, thus making the slurry too viscous to pour from the mill. Regardless of which of the above firing temperatures one chooses, a longer soaking period at peak temperature improves the translucency of the resulting ceramic piece.

Further embodiments of the present invention are

What is claimed is:

1. The process of making an aqueous magnesium oxide slip casting slurry comprising the mixing of minus 200 mesh fused magnesium oxide with water in the proportion of 20 grams of magnesium oxide to 6 grams of water, milling the slurry for at least thirty hours at a temperature of 2–10° C., discharging the slurry from the mill, adding about 5 normal hydrochloric acid as a deflocculent until the slurry has a viscosity of about 100 centipoises, and adding a scum inhibiter.

2. The process of claim 1 where the scum inhibitor is glycerine and is added in the proportion of 1 cc. per 100 grams of slurry.

3. The process of claim 1 where the milling time is not to exceed 72 hours.

4. An improved slip casting method comprising the steps of mixing finely ground fused magnesium oxide with water, milling the slurry for at least about 30 hours at a temperature of 2 to 10° C., discharging the slurry from the mill, adding hydrochloric acid as a deflocculent, adding a scum inhibitor, immediately pouring said slurry into an uncoated plaster mold, and immediately drying and firing said slurry.

5. The method of claim 4 wherein the fused magnesium oxide is of the size minus two hundred mesh and is mixed with the water in a proportion of 20 parts by weight of magnesium oxide to 6 parts by weight of water.

6. The method of claim 5 wherein the hydrochloric acid is about 5 normal and is added until the slurry has a viscosity of about one hundred centipoises.

References Cited in the file of this patent

UNITED STATES PATENTS 2,902,380    Allison _____ Sept. 1, 1959

FOREIGN PATENTS 566,398    Canada _____ Nov. 18, 1958